US010244486B2

(12) United States Patent
Lee

(10) Patent No.: US 10,244,486 B2
(45) Date of Patent: *Mar. 26, 2019

(54) METHOD FOR OPERATING FEMTOCELL IN WIRELESS COMMUNICATION SYSTEM

(71) Applicant: IBEX PT HOLDINGS CO., LTD., Seoul (KR)

(72) Inventor: Yongseok Lee, Yongin-si (KR)

(73) Assignee: IBEX PT HOLDINGS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,809

(22) Filed: Feb. 7, 2018

(65) Prior Publication Data

US 2018/0167893 A1 Jun. 14, 2018

Related U.S. Application Data

(63) Continuation of application No. 14/134,256, filed on Dec. 19, 2013, which is a continuation of application
(Continued)

(30) Foreign Application Priority Data

Jun. 19, 2009 (KR) ........................ 10-2009-0055178

(51) Int. Cl.
*H04W 36/00* (2009.01)
*H04W 52/24* (2009.01)
(Continued)

(52) U.S. Cl.
CPC ........... *H04W 52/243* (2013.01); *H04W 4/06* (2013.01); *H04W 36/0061* (2013.01);
(Continued)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS

2003/0165146 A1 9/2003 Sultan et al.
2007/0097939 A1 5/2007 Nylander et al.
(Continued)

FOREIGN PATENT DOCUMENTS

KR 10-0441218 7/2004
KR 10-2006-0126497 12/2006

OTHER PUBLICATIONS

LTE, The UMTS Long Term Evolution, From Theory to Practice, 2009, 5 pages, John Wiley & Sons Ltd.
(Continued)

*Primary Examiner* — Dai Phuong
(74) *Attorney, Agent, or Firm* — Ked & Associates, LLP

(57) ABSTRACT

A method for operating a femtocell in a wireless communication system comprises the steps of: triggering the switching from the operation mode for providing a service to closed subscriber group (CSG) terminals which belong to a specific terminal group and to non-CSG terminals which do not belong to the specific terminal group, to the operation mode for providing the service only to said CSG terminals; and commanding said non-CSG terminals to change the operation mode, and carrying out a handover. The method of the present invention improves efficiency of femtocell operation, and reduces restrictions on terminals disposed in the vicinity of the femtocell. The method of the present invention can utilize the unused frequency range of the femtocell, thereby providing a service with a high data ratio.

9 Claims, 9 Drawing Sheets

Related U.S. Application Data

No. 13/133,430, filed as application No. PCT/KR2009/007575 on Dec. 17, 2009, now Pat. No. 8,630,650.

(60) Provisional application No. 61/138,230, filed on Dec. 17, 2008.

(51) Int. Cl.
  *H04W 4/06* (2009.01)
  *H04W 52/02* (2009.01)
  *H04W 88/10* (2009.01)
  *H04W 36/04* (2009.01)
  *H04W 84/04* (2009.01)
  *H04W 36/24* (2009.01)
  *H04W 52/28* (2009.01)

(52) U.S. Cl.
  CPC ..... *H04W 52/0206* (2013.01); *H04W 52/244* (2013.01); *H04W 88/10* (2013.01); *H04W 36/04* (2013.01); *H04W 36/24* (2013.01); *H04W 52/288* (2013.01); *H04W 84/045* (2013.01); *Y02D 70/00* (2018.01); *Y02D 70/1222* (2018.01); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/162* (2018.01); *Y02D 70/164* (2018.01); *Y02D 70/23* (2018.01)

(58) Field of Classification Search
  CPC ..... H04W 16/32; H04W 24/00; H04W 28/04; H04W 72/082; H04W 4/02; H04W 64/00; H04L 29/08657
  USPC ........................ 455/432.1–453, 456.1–456.3; 370/331–334
  See application file for complete search history.

(56) References Cited

U.S. PATENT DOCUMENTS

| | | |
|---|---|---|
| 2007/0270152 A1 | 11/2007 | Nylander et al. |
| 2008/0207170 A1* | 8/2008 | Khetawat ............ H04W 60/005 455/411 |
| 2009/0093232 A1* | 4/2009 | Gupta .................. H04L 63/104 455/410 |
| 2009/0253421 A1 | 10/2009 | Camp, Jr. et al. |
| 2009/0305671 A1* | 12/2009 | Luft .................. G06Q 30/0205 455/411 |
| 2010/0056184 A1 | 3/2010 | Vakil et al. |
| 2010/0153816 A1 | 6/2010 | Li et al. |
| 2011/0021240 A1 | 1/2011 | Hiltunen et al. |
| 2011/0128916 A1 | 6/2011 | Kwon et al. |
| 2011/0237251 A1 | 9/2011 | Chow et al. |
| 2011/0244870 A1* | 10/2011 | Lee ..................... H04W 52/244 455/444 |
| 2012/0244830 A1* | 9/2012 | Bao ....................... H04W 36/22 455/404.1 |
| 2014/0045495 A1* | 2/2014 | Deshpande .......... H04J 11/0093 455/434 |
| 2014/0087732 A1* | 3/2014 | Matsuo ................ H04J 11/0069 455/436 |

OTHER PUBLICATIONS

International Search Report dated Aug. 17, 2010 issued in PCT Application No. PCT/KR2009/007575.

3GPP TS 36.300, V10.2.0 (Dec. 20102), 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10), 4 pages.

U.S. Office Action dated Jun. 7, 2012 issued in U.S. Appl. No. 13/133,430.

U.S. Final Office Action dated Feb. 12, 2013 issued in U.S. Appl. No. 13/133,430.

U.S. Office Action dated May 21, 2013 issued in U.S. Appl. No. 13/133,430.

U.S. Notice of Allowance dated Sep. 10, 2013 issued in U.S. Appl. No. 13/133,430.

U.S. Office Action dated Jun. 10, 2015 issued in co-pending U.S. Appl. No. 14/134,256.

\* cited by examiner

METHOD FOR OPERATING FEMTOCELL IN WIRELESS COMMUNICATION SYSTEM

CROSS-REFERENCE TO RELATED APPLICATIONS

This application is a Continuation Application of prior U.S. patent application Ser. No. 14/134,256, filed on Dec. 19, 2013, which is a Continuation Application of prior U.S. patent application Ser. No. 13/133,430, filed on Jun. 8, 2011, now U.S. Pat. No. 8,630,650, issued on Jan. 14, 2014, which is a National Stage Application of International Patent Application No. PCT/KR2009/007575, filed on Dec. 17, 2009, which claims the benefit of U.S. Provisional Application No. 61/138,230, filed on Dec. 17, 2008, and claims priority under 35 U.S.C. § 119 to Korean Application No. 10-2009-0055178, filed on Jun. 19, 2009, whose entire disclosures are hereby incorporated by reference.

TECHNICAL FIELD

The present invention relates to wireless communications and more particularly, to a method for operating a femtocell.

BACKGROUND ART

Along with the development of communications and the proliferation of multimedia technology, a variety of large-capacity transmission techniques have been adopted for wireless communication systems. Although wireless capacity can be increased by allocating more frequency resources, there is a limit to allocating more frequency resources to multiple users due to limited frequency resources. One approach to efficient utilization of the limited frequency resources is to scale down the sizes of cells. In a smaller cell, a Base Station (BS) may service a reduced number of users and thus may allocate more frequency resources to the users. A large-capacity service with better quality can be provided to multiple users by reducing the sizes of cells.

Femtocells installed in houses and offices are a recent extensive research area. A femtocell is an ultra-small mobile communication BS deployed for indoor use such as a house or an office. While a femtocell is regarded as a similar type to a picocell, the former is more advanced than the latter in terms of functions. The femtocell is connected to an Internet Protocol (IP) network available in the home or office and provides a mobile communication service by accessing the Core Network (CN) of a mobile communication system through the IP network. For example, the femtocell is connected to the CN of the mobile communication system via a Digital Subscriber Line (DSL). In the mobile communication system, a user may receive a service from a legacy macrocell outdoors and from a femtocell indoors. Femtocells are complementary to legacy macrocells whose services get poor within buildings, thereby improving indoor coverage of the mobile communication system. Since the femtocells serve only specified users, they can provide high-quality voice and data services to the users. Furthermore, the femtocells can provide new services that are not available from the legacy macrocells. The widespread use of femtocells is a driving force behind Fixed-Mobile Convergence (FMC) and reduces industrial cost.

A femtocell is personal communication equipment that an individual installs in his or her house or an office, accessible to specific users only. Once it is powered on, communication equipment installed in a house or an office is typically kept powered-on even though it is not in use. To reduce interference between a femtocell and a macrocell, the femtocell may operate in a different frequency band from that of a macrocell. When a User Equipment (UE) is located in the service area of a femtocell inaccessible to the UE, the UE should use a frequency band other than a frequency band allocated to the femtocell, irrespective of whether the frequency band of the femtocell is used or unused. The resulting possible limit to the use of radio resources for UEs located near to the femtocell may lead to inefficient use of limited radio resources.

Accordingly, there exists a need for a method for efficiently operating a femtocell.

DISCLOSURE

Technical Problem

An object of the present invention devised to solve the conventional problem is to provide a method for efficiently operating a femtocell.

Technical Solution

In an aspect of the present invention, a method for operating a femtocell in a wireless communication system includes triggering switching from an operation mode for providing a service to a Closed Subscriber Group (CSG) terminal that belongs to a specific terminal group and to a non-CSG UE that does not belong to the specific UE group to an operation mode for providing the service only to the CSG terminal, and performing handover for the non-CSG UE by commanding the non-CSG terminal to switch an operation mode of the non-CSG UE.

In another aspect of the present invention, a method for operating a femtocell in a wireless communication system includes triggering switching from an operation mode for providing a service only to a Closed Subscriber Group (CSG) terminal that belongs to a specific terminal group to an operation mode for providing the service to the CSG terminal and to a non-CSG UE that does not belong to the specific terminal group, and notifying the CSG terminal or the non-CSG terminal of the operation mode switching.

In a further aspect of the present invention, a method for performing a handover operation in a wireless communication system having a hierarchical cell structure with a macrocell and a femtocell includes determining a handover criterion, and determining to perform handover according to the handover criterion and performing the handover to a macrocell or a neighbor femtocell. The handover criterion is at least one of a power-off state of a connected femtocell, whether or not a data rate of the connected femtocell is equal to or lower than a threshold, and a service policy of the femtocell.

Advantageous Effects

A femtocell can be efficiently operated and limitations imposed on a UE near to the femtocell can be mitigated. In addition, the unused frequency band of the femtocell can be utilized, thereby enabling provisioning of a high-rate service.

BEST MODE FOR CARRYING OUT THE INVENTION

The technology as set forth herein is applicable to a variety of wireless communication systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA can be implemented into a radio technology such as Universal Terrestrial Radio Access (UTRA) or CDMA2000. TDMA can be implemented into a radio technology such as Global System for Mobile communications (GSM)/General Packet Radio Service (GPRS)/Enhanced Data Rates for GSM Evolution (EDGE). OFDMA can be implemented into a radio technology such as Institute of Electrical and Electronics Engineers (IEEE) 802.11 (Wi-Fi), IEEE 802.16e (WiMAX), IEEE 802-20, Evolved UTRA (E-UTRA), etc. UTRA is a part of Universal Mobile Telecommunications System (UMTS). 3rd Generation Partnership Project (3GPP) Long Term Evolution (LTE) is a part of Evolved UMTS (E-UMTS) using E-UTRA. OFDMA is adopted for downlink and SC-FDMA is adopted for uplink in 3GPP LTE. IEEE 802.16m is an evolution of IEEE 802.16e.

Figure 1:
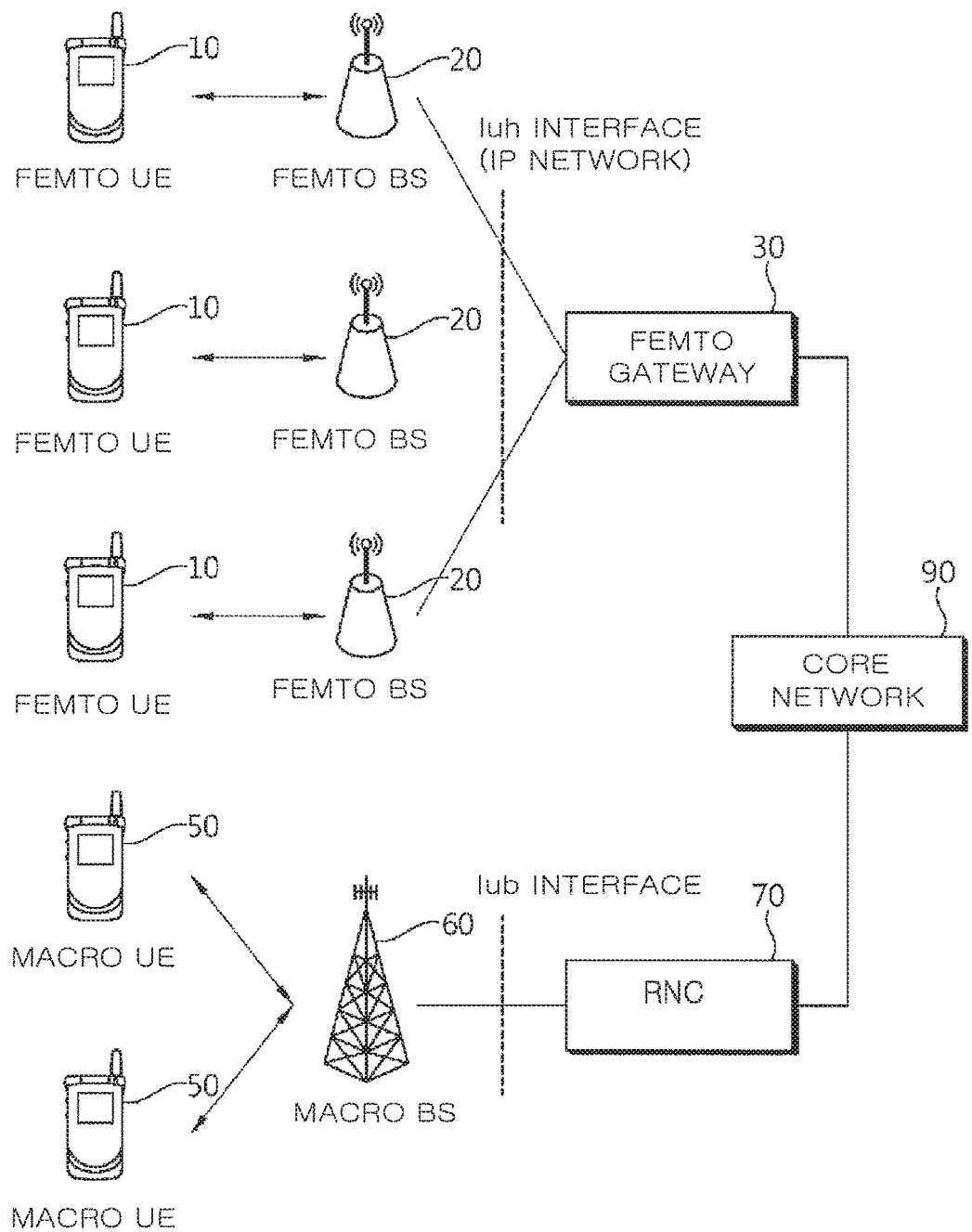
FIG. 1 is a block diagram of a wireless communication system.

FIG. 1 is a block diagram of a wireless communication system. The wireless communication system is deployed widely in order to provide various communication services such as voice, packet data, etc.

Referring to FIG. 1, a typical wireless communication system includes a User Equipment (UE) and a Base Station (BS). The UE is fixed or mobile and interchangeably used with a Mobile Station (MS), a User Terminal (UT), a Subscriber Station (SS), a wireless device, etc. The BS is generally a fixed station communicating with a UE. The term BS may be replaced with a Node-B, a Base Transceiver System (BTS), an access point, etc.

One BS may cover one or more cells.

BSs may be classified into femto BSs 20 and macro BSs 60 according to their cell coverage or deployments. A cell covered by a femto BS 20 is smaller than a cell covered by a macro BS 60. The cell of the femto BS 20 may wholly or partially overlap with the cell of the macro BS 60. This structure in which a wide cell is overlaid with a small cell is referred to as a hierarchical cell structure.

The femto BS 20 may also be called a femtocell, a home Node-B, a home eNode-B (HeNB), a Closed Subscriber Group (CSG) cell, etc. The macro BS 60 may be called a macrocell, distinguishably from a femtocell.

The femto BS 20 is connected to a femto GateWay (GW) via an Iuh interface. The Iuh interface interfaces between the femto BS 20 and the femto GW 30 through an Internet Protocol (IP) network. The femto GW 30 is an entity that manages at least one femto BS 20. To allow the femto BS 20 to access a Core Network (CN) 90 of the wireless communication system, the femto GW 30 may perform registration, authentication and security procedures for the femto BS 20. The macro BS 60 is connected to a Radio Network Control (RNC) 70 via an Iub interface. The RNC 70 is an entity that manages at least one macro BS 60 and connects the macro BS 60 to the CN 90. While the macro BS 60 is connected to the CN 90 via a dedicated line, the femto BS 20 is connected to the CN 90 through the IP network. While femto BSs 20 are shown herein as connected to the CN 90 via the femto GW 30, they may be connected directly to the CN 90 without intervention of the femto GW 30.

UEs connected to the femto BSs 20 and UEs connected to the macro BS 60 are referred to as femto UEs 10 and macro UEs 50, respectively. A femto UE 10 may become a macro UE 50 through handover to a macro BS, and a macro UE 50 may become a femto UE 10 through handover to a femto BS.

The femto BSs 20 may be connected to the IP network wirelessly or by cable. For connectivity between the femto BSs 20 and the IP network, a known module such as one conforming to wireless LAN, ZigBee, Power Line Communication (PLC), Home Phone Networking Alliance (HomePNA), RS-485, etc. may be used. A femto BS connected wirelessly to the IP network is referred to as a wireless femtocell. The wireless femtocell may use a battery for user convenience and thus a method for reducing battery power consumption is needed for the wireless femtocell. To reduce power consumption of the femto BSs 20 and efficiently use limited radio resources, operation modes may be defined for the femto BSs 20. For example, the femto BSs 20 may provide services in the operation modes of idle mode, active mode, etc. A wireless femtocell may be incorporated into a wireless Access Point (AP), with a wireless LAN function. The wireless femtocell may be installed in a transportation vehicle. This type of femtocell which resides in a vehicle and thus has mobility is referred to as a mobile femtocell.

<Deployment Relationship between Macro BS and Femto GW>

The femto GW 30 may be configured in relation to the macro BS 60. For instance, the femto GW 30 and the macro BS 60 may be in a one-to-one correspondence. Or a femto GW 30 may be configured for each of a plurality of sectors covered by the macro BS 60. Or the cell area of the macro BS 60 is divided into a plurality of areas and a femto GW 30 is configured for each of the areas or each of groups into which the areas are grouped. Or a plurality of macro BSs 60 are grouped and a femto GW 30 is configured for each macro BS group. Or a femto GW 30 may be configured for each tracking area. Or the management range of a femto GW 30 may be defined irrespective of a macro BS 30 or a tracking area.

When a femto BS 20 or the macro BS 60 performs a self-organization procedure, the femto BS 20 or the macro BS 60 may request configuration information about the above-described femto GW 30 to the CN 90. Then the CN 90 may provide the configuration information about the femto GW 30 to the femto BS 20 or the macro BS 60. When needed, the femto BS 20 or the macro BS 60 may transmit the configuration information about the femto GW 30 to a femto UE 10 or a macro UE 50. The configuration information about the femto GW 30 may include IDentifier (ID) information of the femto GW 30, etc.

In the wireless communication system, the macro BS 60 may use Fractional Frequency Reuse (FFR) to increase the efficiency of radio resources. The macro BS 60 may determine an FFR factor, taking into account the deployment of the femto BSs 20. The macro BS 60 may set a threshold regarding the deployment of the femto BSs 20 and if the deployment of the femto BSs 20 is at or above the threshold, the macro BS 60 may assign a low FFR factor to macro UEs 50. The threshold regarding the deployment of the femto BSs 20 may be the number, density, etc. of the femto BSs 20 deployed in a predetermined area.

The macro BS 60 may have a plurality of sectors and use different frequency bands in the different sectors. A femto BS 20 located in each sector of the macro BS 60 may operate in the frequency band of another sector. Hence, interference between the macro BS 60 and the femto BS 20 can be mitigated. FFR may be implemented between femto BSs 20 via a radio interface between the femto BSs 20 or via the femto GW 30. For example, adjacent femto BSs 20 may allocate frequency bands by exchanging their FFR information between them, in a manner that minimizes interference. Alternatively, a femto BS 20 may request a frequency band for FFR to the femto GW 30 and the femto GW 30 may then allocate a frequency band for FFR to the femto BS 20, taking into account the deployment of the femto BSs 20.

The macro BS 60 or the femto BSs 20 may broadcast information about the femto BSs 20. The macro UEs 50 or the femto UEs 10 may acquire information about their neighbor femto BSs 20 by monitoring broadcast messages from the femto BSs 20. The macro BS 60 or the femto BSs 20 may multicast or unicast system information about the femto BSs 20, instead of broadcasting the system information.

Cell ID sets of the macro BS 60 and the femto BSs 20 may be delivered in predetermined different symbols or sequences. A femto UE 10 or macro UE 50 in RRC_IDLE state or RRC_CONNECTED state may select or reselect a cell by autonomous search or manual search. The automatic search is a cell selection scheme in which the UE autonomously searches for a cell for cell selection or reselection without receiving a command from a BS or being allocated a gap for the cell search from the BS. The manual search is a cell selection scheme in which a UE performs cell selection or reselection using a gap allocated by a BS. A UE in RRC_CONNECTED state may notify the network that it needs a measurement gap for autonomous search, and the network may then allocate a measurement gap to the UE. With intra-frequency mobility, a UE in RRC_IDLE state may select a highest-ranking cell from among accessible femto BSs 20 according to the best cell principle.

A UE may report the information indicating appropriate accessible femto BSs to its serving BS. The serving BS is a femto BS or macro BS that is providing a communication service to the UE. The UE may determine the appropriate accessible femto BSs based on its white list. The white list tabulates accessible femto BSs and contains information about the states of the femto BSs, etc. The white list may be signaled by a higher layer. A femto BS 20 or the macro BS 60 may use a cell indicator (ex. 1 bit) or a specific Physical Cell ID (PCI) in order to indicate whether the BS is a femto BS. The cell indicator may be transmitted in a broadcast message or a paging message.

Hereinbelow, a downlink (DL) refers to communication directed from a BS to a UE and an uplink (UL) refers to communication directed from a UE to a BS. A transmitter may be a part of the BS and a receiver may be a part of the UE on the downlink, whereas the transmitter may be a part of the UE and the receiver may be a part of the BS on the uplink.

The wireless communication system is not limited to any specific multiple access scheme. Rather, a variety of multiple access schemes are available to the wireless communication system, such as CDMA, WCDMA, TDMA, FDMA, SC-FDMA, and OFDMA.

Figure 2:
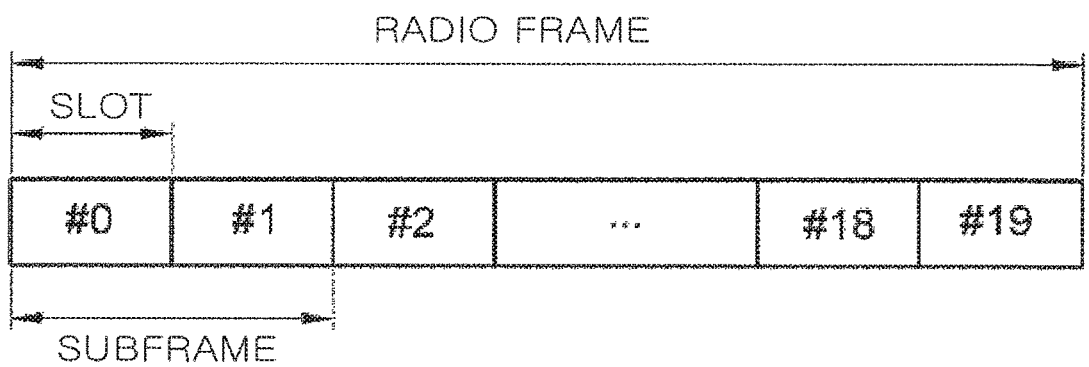
FIG. 2 illustrates an exemplary radio frame structure.

FIG. 2 illustrates an exemplary radio frame structure. The radio frame structure may be used for at least one of a macrocell and a femtocell in a hierarchical cell structure.

Referring to FIG. 2, a radio frame is divided into 10 subframes, each subframe including two slots. The slots of the radio frame are numbered 0 to 19. Time taken to transmit one subframe is defined as a Transmission Time Interval (TTI). That is, the TTI is a scheduling unit for data transmission. For example, one radio frame may be 10 ms, one subframe may be 1 ms, and one slot may be 0.5 ms, in duration.

A subframe may be divided into two slots in the time domain. A slot is a unit for allocating radio resources in the time and frequency domains. One slot may include a plurality of OFDM symbols in the time domain and at least one subcarrier in the frequency domain. For example, one slot may include 7 or 6 OFDM symbols. A subframe may be divided into a plurality of Resource Blocks (RBs). An RB is a basic unit of radio resources allocated to a UE. An RB may include a plurality of subcarriers. For example, an RB may be defined by 12 contiguous subcarriers in the frequency domain by two slots in the time domain. 10 subframes may form one radio frame.

The frequency band of a subframe may be divided into three segments, of which both side segments are allocated as a control region and the middle segment is allocated as a data region. Since different frequency bands are allocated to the control region and the data region, the control region and the data region are multiplexed in FDM (Frequency Division Multiplexing). However, this is purely exemplary and thus the layout of the control region and the data region in a subframe is not limited to the specific one. In addition, the number of subframes in a radio frame, the number of slots in a subframe, or the number of OFDM symbols in a slot may vary.

Frequency hopping may occur between slots allocated to each UE in a subframe. That is, one frequency band at one side is allocated to the UE in one of the two slots and another frequency band at the other side is allocated to the UE in the other slot. As a control region resides in the different frequency bands of the slots for the UE, a frequency diversity gain can be achieved. Signals for a plurality of users may be multiplexed in CDM (Code Division Multiplexing).

The above radio frame structure is purely exemplary and thus the number of subframes in a radio frame or the number of slots in a subframe may vary.

Figure 3:
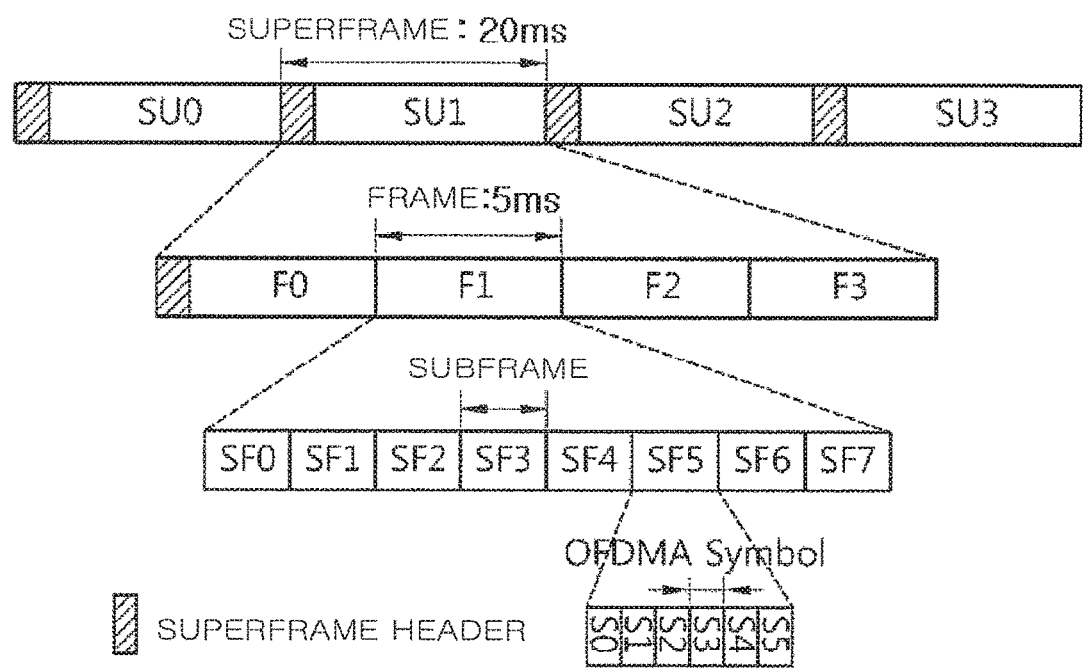
FIG. 3 illustrates an exemplary frame structure.

FIG. 3 illustrates an exemplary frame structure. In a hierarchical cell structure, the frame structure may be used for at least one of a macrocell and a femtocell.

Referring to FIG. 3, a superframe includes a superframe header and four frames F0, F1, F2 and F3. Each superframe and each frame are, by way of example, but not limited to, 20 ms and 5 ms respectively in duration. The superframe header may be located at the start of the superframe and a common control channel is allocated to the superframe header. The common control channel delivers control information common to all UEs within a cell, such as information about the frames of the superframe or system information. A synchronization channel may be disposed within the superframe header or in the vicinity of the superframe header to transmit a synchronization signal. The synchronization signal may carry cell information such as a cell ID.

One frame is divided into a plurality of subframes SF0, SF1, SF2, SF3, SF4, SF5, SF6 and SF7. Each subframe may be used for uplink or downlink transmission. A subframe may include 6 or 7 OFDMA symbols, by way of example. A frame may be configured in Time Division Duplexing (TDD) or Frequency Division Duplexing (FDD). In TDD, each subframe is used for uplink transmission and downlink transmission at different time points in the same frequency. That is, the subframes of a TDD frame are divided into uplink subframes and downlink subframes in time. In FDD, each subframe is used for uplink transmission and downlink transmission in different frequencies at the same point of time. That is, the subframes of an FDD frame are divided into uplink subframes and downlink subframes in frequency. The uplink transmission and the downlink transmission may take place simultaneously in different frequency bands.

A subframe is divided into one or more frequency partitions. Each frequency partition includes one or more Physical Resource Units (PRUs), that is, contiguous/localized and/or distributed/non-contiguous PRUs. Each frequency partition can be used for different purposes such as FFR or Multicast and Broadcast Services (MBS).

A PRU is a basic physical unit for resource allocation that includes a plurality of physically contiguous OFDMA symbols and a plurality of physically contiguous subcarriers. The number of OFDM symbols in the PRU may be equal to the number of OFDMA symbols in a subframe. For instance, if one subframe includes 6 OFDMA symbols, the PRU may be defined as 18 subcarriers by 6 OFDMA symbols. A logical Resource Unit (LRU) is a basic logical unit for distributed and localized resource allocations. An LRU is defined as a plurality of OFDMA symbols and a plurality of subcarriers, including pilots used in the PRU. Accordingly, the effective number of subcarriers in an LRU depends on the number of allocated pilots.

A Distributed Resource Unit (DRU) may be used to achieve a frequency diversity gain. The DRU contains a group of distributed subcarriers within a frequency partition. The physical size of the DRU is equal to that of the PRU. One or more subcarriers may be a minimum unit of physically contiguous subcarriers that form each distributed subcarrier group in a DRU.

A Contiguous Resource Unit (CRU) also known as a localized resource unit may be used to achieve a frequency selective scheduling gain. The CRU contains a localized subcarrier group. The physical size of the CRU is equal to that of the PRU. The CRU and the DRU may be supported in FDM in the frequency domain.

Figure 4:
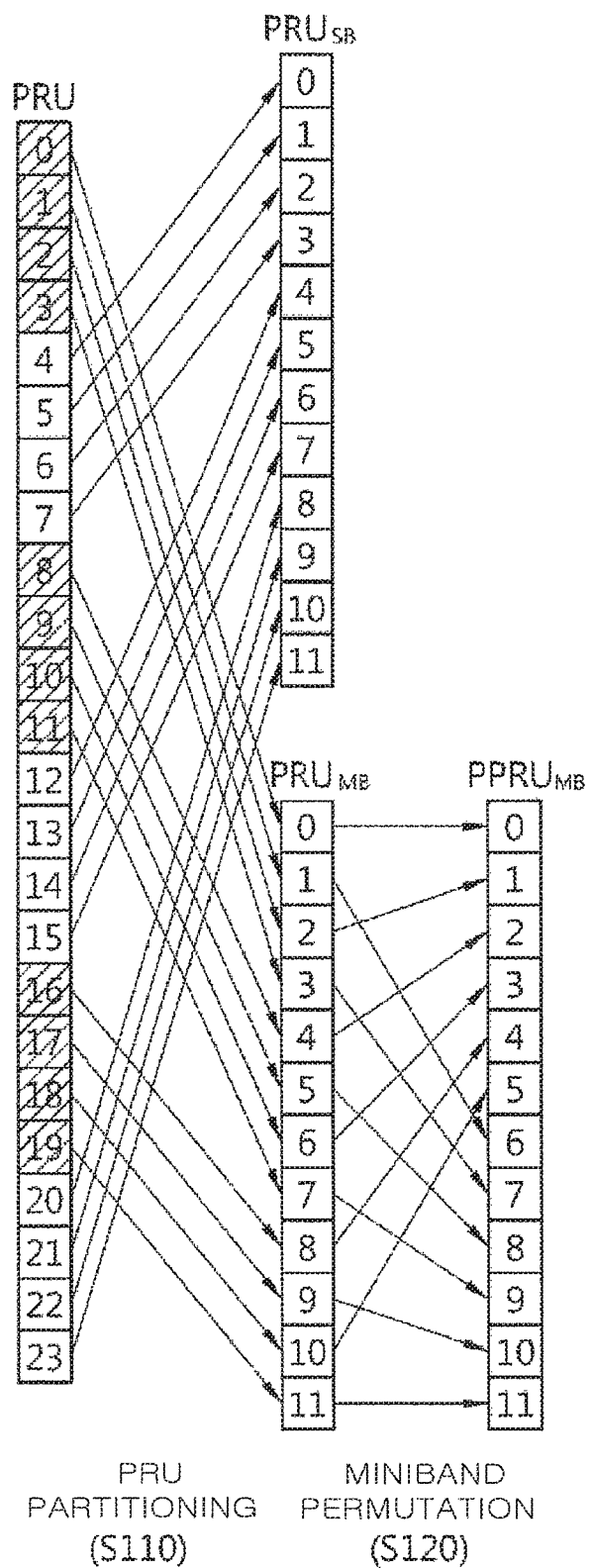
FIG. 4 illustrates exemplary mapping of physical resource units.

FIG. 4 illustrates exemplary mapping of PRUs.

Referring to FIG. 4, the total subcarriers of a system bandwidth are divided into PRUs. One PRU may include 18 subcarriers in frequency by 6 or 7 OFDMA symbols in time. The number of OFDM symbols in the PRU depends on a subframe type. Subframes may be categorized into Type 1 with 6 OFDMA symbols and Type 2 with 7 OFDM symbols, to which the present invention is not limited. Thus, subframe types including various numbers of OFDM symbols such as 5 OFDMA symbols, 9 OFDMA symbols, etc. may be defined.

PRUs are divided into subbands and minibands according to a predetermined PRU partitioning rule (S110). A subband is a unit of PRUs contiguous in frequency or a minimum unit for forming CRUs. The frequency-domain size of the subband may be 4 PRUs. A miniband is a unit of distributed PRUs or a unit for forming DRUs and its frequency-domain size may be 1 PRU or an integer multiple of 1 PRU. The total PRUs may be grouped by fours, that is, in units of four PRUs being the size of a subband and then allocated to subbands and minibands. A PRU used for a subband is denoted by PRUSB and a PRU used for a miniband is denoted by PRUMB. The total number of PRUs is the sum of the number of subband PRUs PRUSB and the number of miniband PRUs PRUMB. The subband PRUs PRUSB and the miniband PRUs PRUMB are reordered. The subband PRUs PRUSB are numbered from 0 to (the number of subband PRUs PRUSB −1) and the miniband PRUs PRUMB are numbered from 0 to (the number of miniband PRUs PRUMB −1).

The sequence of the miniband PRUs PRUMB is permuted in the frequency domain, that is, undergoes miniband permutation to ensure frequency diversity in each frequency partition (S120). That is, the numbered miniband PRUs PRUMB are permuted according to a predetermined permutation rule (or mapping rule). The permuted miniband PRUs are denoted by PPRUMS (permuted-PRUMS).

Then the subband PRUs PRUSB and miniband PRUs PRUMB are allocated to one or more frequency partitions. Each frequency partition is subjected to a cell-specific resource mapping procedure involving CRU/DRU allocation, sector-specific permutation, subcarrier permutation, etc.

In this manner, PRUs are selected in fours and allocated to subbands or minibands. Therefore, the basic number of physically contiguous CRUs in the frequency domain is 4. That is, a physically contiguous frequency band in the frequency domain is configured in units of four CRUs. A part of four PRUs contiguous in the frequency domain may be allocated to user data or a control signal using radio resources less than four PRUs. However, four or more PRUs contiguous in the frequency domain may not be allocated to user data or a control signal using radio resources requiring more than four PRUs. In other words, a channel requiring four or more contiguous PRUs is not supported. Thus there is a limit on radio resource allocation to data of various sizes (hereinbelow, data covers user data and a control signal in its meaning). In addition, on user data or a control signal that uses radio resources requiring four or fewer contiguous PRUs, there is also a constraint that the PRUs should be subband PRUs.

In the wireless communication system, a system bandwidth may be divided into a plurality of frequency partitions which may be allocated for data and/or a control signal of a macrocell, for a broadcast channel of the macrocell, and for a femtocell. The frequency partition for data and/or a control signal of a macrocell may be shared with a femtocell, but the frequency partition for a broadcast channel of the macrocell may not be shared with the femtocell.

<Operation Modes of Femtocell>

Now a description will be given of a method for efficiently operating a femtocell. For efficient operations of the femtocell, its operation modes are classified into (1) public mode, (2) private mode, and (3) flexible private mode.

In (1) public mode, the femtocell operates like a general BS. That is, a public-mode femtocell may be accessible to all UEs, like a macrocell. The public-mode femtocell may be opened to a UE requesting access to the femtocell and provide a service to the UE. The public-mode femtocell is referred to as a public femtocell.

In (2) private mode, a femtocell provides a service only to particular UEs. UEs or a UE group that can access the private-mode femtocell is called a CSG (Closed Subscriber Group). The private-mode femtocell can provide a service only to UEs of a CSG associated with the private-mode femtocell. The private-mode femtocell grants closed access to UEs. The private-mode femtocell is referred to as a private femtocell.

In (3) flexible private mode, a femtocell provides a service to UEs of a CSG associated with the femtocell and to UEs that are not included in the CSG, namely non-CSG UEs. It can be said that the flexible private mode is a hybrid mode of the public mode and the private mode. The flexible private-mode femtocell may provide a service differentially to a CSG UE and a non-CSG UE. The flexible private-mode femtocell assigns access priority to the CSG UE to thereby provide a service to the CSG UE with priority over the non-CSG UE. The flexible private-mode femtocell is referred to as a flexible private femtocell.

The operation mode of a femtocell may be changed according to the policy of an owner or an operator or the service situation of the femtocell. For example, the private-mode femtocell may transition to the flexible private mode according to the adjustment of an owner or an operator or the service situation of the femtocell. The flexible private-mode femtocell may also transition to the private mode according to the adjustment of an owner or an operator or the service situation of the femtocell.

<Transition from Private Mode to Flexible Private Mode>

Figure 5:
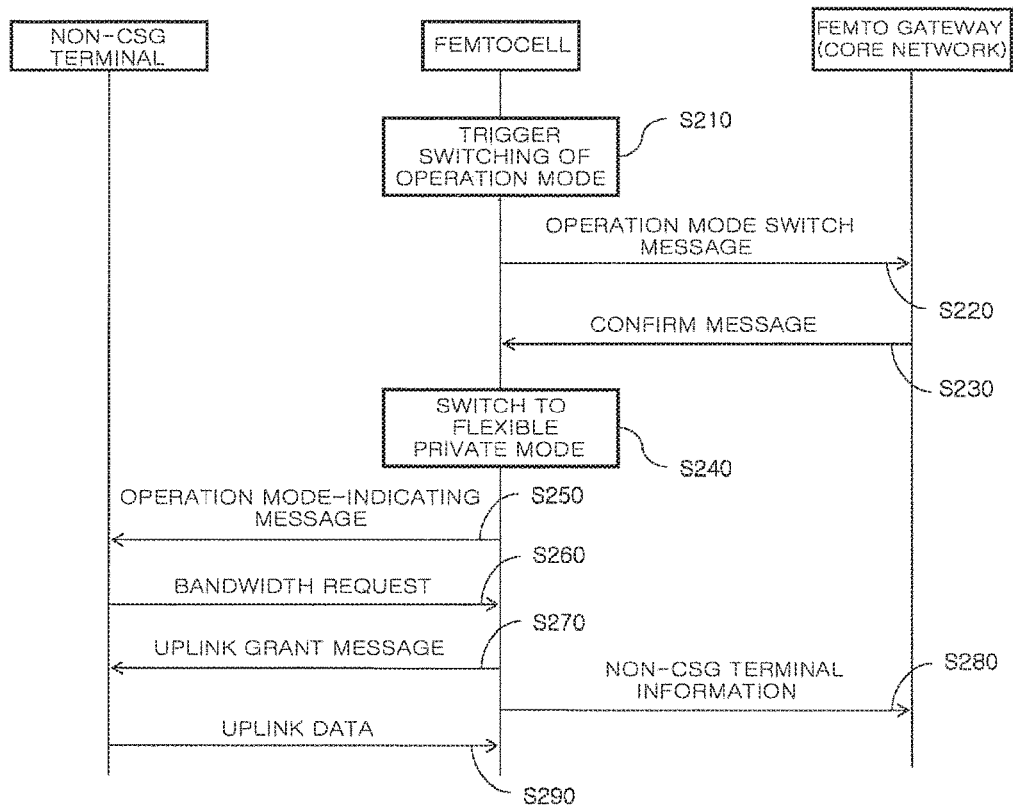
FIG. 5 illustrates a method for switching an operation mode of a femtocell according to an embodiment of the present invention.

FIG. 5 illustrates a method for switching the operation mode of a femtocell according to an embodiment of the present invention. Specifically, FIG. 5 illustrates a procedure for switching a femtocell from the private mode to the flexible private mode and an access procedure of a non-CSG UE according to the operation mode switching of the femtocell.

Referring to FIG. 5, the operation mode of a femtocell may be switched upon occurrence of an operation mode switching trigger (S210). Transition from the private mode to the flexible private mode may be triggered upon request of a CSG UE or non-CSG UE or according to the service situation of the femtocell. A private femtocell may determine to switch its operation mode, upon receipt of an access request from a non-CSG UE. Or the private femtocell may determine to transition to the flexile private mode, when a current data rate is low relative to its available maximum data rate. For instance, when all CSG UEs within the private femtocell is in idle mode or sleep mode or when no CSG UE exists within the private femtocell, the private femtocell may determine to transition to the flexible private mode. Or if a data rate provided to a CSG UE within the private femtocell is equal to or lower than a predetermined threshold, the private femtocell may determine to transition to the flexible private mode. If the remainder of the bandwidth of the private femtocell except for a bandwidth allocated to CSG UEs is equal to or higher than a threshold, the private femtocell may determine to transition to the flexible private mode.

When determining to switch its operation mode, the femtocell transmits an operation mode switch message to a femto GW or a CN of the wireless communication system (S220). The operation mode switch message may contain information about the cell ID, CSG ID, CSG list, operation mode, etc. of the femtocell. Operation mode switching may amount to new setup of the femtocell. Operation mode switching information may be included in a setup message of the femtocell.

The femto GW or the CN may reply to the femtocell with a confirm message in response to the operation mode switch message (S230). The confirm message may not be transmitted in response to the operation mode switch message according to system implementation.

The femtocell transitions to the flexible private mode (S240). The flexible private femtocell is accessible to non-CSG UEs as well as CSG UEs. The flexible private femtocell may grant access and provide a service to a CSG UE with priority over a non-CSG UE by assigning access priority to the CSG UE.

After transitioning to the flexible private mode, the femtocell transmits an operation mode-indicating message (S250). The operation mode-indicating message may contain an indicator of one or more bits indicating the operation mode of the femtocell. For example, if the bit value of the indicator is 0, this may indicate the private mode and if the bit value of the indicator is 1, this may indicate the flexible private mode, or vice versa. That is, if the bit value of the indicator is 1, this may indicate the private mode and if the bit value of the indicator is 0, this may indicate the flexible private mode. The operation mode-indicating message may be delivered in a ranging message, a paging message, a broadcast message, a synchronization signal, or system information. For instance, the indicator indicating the operation mode of the femtocell may be added to the ranging message, the paging message, the broadcast message, the synchronization signal, or the system information to thereby indicate the operation mode of the femtocell or the operation mode switching of the femtocell. Or the operation mode switching of the femtocell may be indicated without using an additional bit through phase shifting of the ranging message, the paging message, the broadcast message, the synchronization signal, or the system information. Or the Cyclic Redundancy Check (CRC) of the ranging message, the paging message, the broadcast message, the synchronization signal, or the system information may be masked by the indicator indicating the operation mode of the femtocell. The operation mode-indicating message may be transmitted in a higher layer message such as a Radio Resource Control (RRC) message, a Media Access Control (MAC) message, or an L1/L2 message. The operation mode-indicating message may be broadcast.

On the other hand, the private femtocell may indicate its operation mode to UEs by transmitting its CSG ID, whereas the flexible private femtocell may indicate its operation mode to UEs by not transmitting its CSG ID. Or when the femtocell is in the private mode and the flexible private mode, it may indicate its operation modes by means of different cell IDs. That is, a cell ID for the private mode and a cell ID for the flexible private mode may be defined separately. Some of existing macrocell IDs or newly defined cell IDs may be used for femtocells. Some of the femtocell IDs may be used for the private mode, while the other femtocell IDs may be used for the flexible private mode.

Upon receipt of the operation mode-indicating message, a non-CSG UE may transmit a bandwidth request to the flexible private femtocell in order to access the flexible private femtocell (S260). The non-CSG UE, which is not allowed to access a private-mode femtocell, may be in idle mode or conduct communication by accessing a macrocell.

The bandwidth request may be a message containing information needed for allocation of a bandwidth or a bandwidth request indicator. The information needed for bandwidth allocation may contain a UE ID, a flow ID, a scheduling type, etc. The bandwidth request message may be a MAC message. Meanwhile, each of a non-CSG UE and a CSG UE may have a CSG list or a whist list listing accessible cells. Upon receipt of an operation mode-indicating message indicating transition to the flexible private mode, both the non-CSG UE and the CSG UE may update information of their CSG lists or white lists.

The flexible private femtocell transmits an uplink (UL) grant message to the non-CSG UE in response to the bandwidth request (S270). The UL grant message may include an acknowledgment for the bandwidth request, radio resource information for uplink transmission (the position and size of radio resources), a UE ID, etc. The flexible private femtocell may authorize the non-CSG UE and grant access to the non-CSG UE through authentication.

The flexible private femtocell may transmit information about the non-CSG UE requesting access to the femto GW or the CN (S280). The femto GW or the CN may acquire the information about the non-CSG UE and perform procedures such as location update, paging, etc. for the non-CSG UE.

Upon receipt of the UL grant message, the non-CSG UE may transmit uplink data in the allocated uplink radio resources (S290).

<Transition from Flexible Private Mode to Private Mode>

Figure 6:
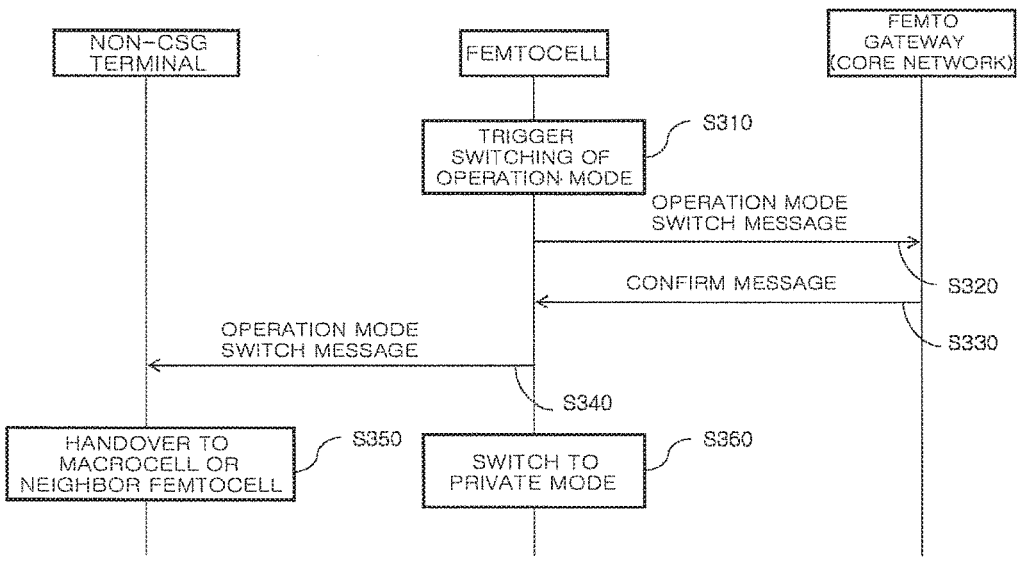
FIG. 6 illustrates a method for switching an operation mode of a femtocell according to another embodiment of the present invention.

FIG. 6 illustrates a method for switching the operation mode of a femtocell according to another embodiment of the present invention. Specifically, FIG. 6 illustrates a procedure for switching a femtocell from the flexible private mode to the private mode and an access procedure of a non-CSG UE according to the operation mode switching of the femtocell.

Referring to FIG. 6, the operation mode of a femtocell may be switched upon occurrence of an operation mode switching trigger (S310). Transition from the flexible private mode to the private mode may be triggered upon request of a CSG UE or according to the service situation of the femtocell. A flexible private femtocell may determine to change its operation mode, upon receipt of an access request from a CSG UE. Because the flexible private femtocell assigns access priority to a CSG UE, it may determine to transition to the private mode, upon request of the CSG UE for access. Or while the flexible private femtocell is providing a service to a CSG UE and a non-CSG UE, if the data rate of the CSG UE is increased and thus the service to the non-CSG UE may affect the service to the CSG UE, the flexible private femtocell may determine to transition to the private mode. If a data rate provided to a CSG UE within the flexible private femtocell is equal to or higher than a predetermined threshold, the flexible private femtocell may determine to transition to the private mode. If the remainder of the bandwidth of the flexible private femtocell except for a bandwidth allocated to CSG UEs is equal to or lower than a threshold, the flexible private femtocell may determine to transition to the private mode.

When determining to switch its operation mode, the femtocell transmits an operation mode switch message to the femto GW or the CN of the wireless communication system (S320). The operation mode switch message may contain information about the cell ID, CSG ID, CSG list, operation mode, etc. of the femtocell. Operation mode switching may amount to new setup of the femtocell. Operation mode switching information may be included in a setup message of the femtocell.

The femto GW or the CN may reply to the femtocell with a confirm message in response to the operation mode switch message (S330). The confirm message may not be transmitted in response to the operation mode switch message according to system implementation.

The flexible private femtocell transmits an operation mode switch message to UEs (S340). The operation mode switch message transmitted to the UEs indicates that the flexible private femtocell will transition to the private mode a predetermined time later. The operation mode switch message may be broadcast to all UEs, or may be multicast or unicast to non-CSG UEs connected to the flexible private femtocell. The operation mode switch message may be transmitted a predetermined number of times, at every predetermined interval until before the operation mode of the flexible private femtocell is switched. The operation mode switch message may specify a time when the flexible private femtocell is supposed to transition to the private mode. The operation mode switch message may contain an indicator of one or more bits indicating the operation mode switching of the femtocell. For example, if the bit value of the indicator is 0, this may indicate operation mode non-switching and if the bit value of the indicator is 1, this may indicate operation mode switching, or vice versa. That is, if the bit value of the indicator is 0, this may indicate operation mode switching and if the bit value of the indicator is 1, this may indicate operation mode non-switching. The operation mode switch message may be delivered in a ranging message, a paging message, a broadcast message, a synchronization signal, or system information. For instance, the indicator indicating the operation mode switching of the femtocell may be added to the ranging message, the paging message, the broadcast message, the synchronization signal, or the system information to thereby indicate the operation mode of the femtocell or the operation mode switching of the femtocell. Or the operation mode switching of the femtocell may be indicated without using an additional bit through phase shifting of the ranging message, the paging message, the broadcast message, the synchronization signal, or the system information. Or the CRC of the ranging message, the paging message, the broadcast message, the synchronization signal, or the system information may be masked by the indicator indicating the operation mode of the femtocell, thereby indicating the operation mode switching of the femtocell. The operation mode switch message may be transmitted through a higher layer message such as an RRC message, a MAC message, or an L1/L2 message.

Upon receipt of the operation mode switch message indicating transition to the private mode, a non-CSG UE performs handover to a macrocell or another neighbor femtocell (S350). That is, the operation mode switch message indicating transition to the private mode may be a handover indication message for the connected non-CSG UE. Upon receipt of the operation mode switch message indicating transition to the private mode, the non-CSG UE may update information of its CSG list or white list.

After transmitting the operation mode switch message to the UEs, the flexible private femtocell transitions to the private mode (S360). The transition to the private mode may occur a predetermined time after transmitting the operation mode switch message.

<Operation Mode Switching of Non-Overlapped Femtocell>

Figure 7:
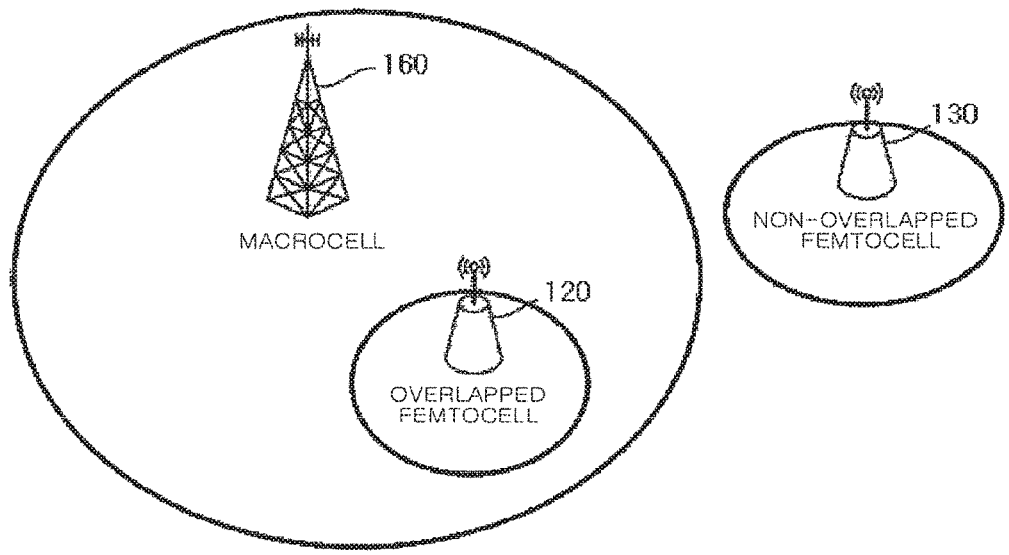
FIG. 7 illustrates exemplary deployment relationships between a macrocell and femtocells.

FIG. 7 illustrates deployment relationships between a macrocell and femtocells.

Referring to FIG. 7, a femtocell may be deployed within the cell area of a macrocell 160. This femtocell is referred to as an overlapped femtocell 120. A femtocell may also be deployed outside the cell area of the macrocell 160. This cell is referred to as a non-overlapped femtocell. The non-overlapped femtocell may be an independent femtocell that does not belong to the cell area of any other BS of a different system, or a semi-independent femtocell that belongs to the cell area of a BS of a different system.

As described before, the overlapped femtocell 120 and the non-overlapped femtocell 130 may switch their operation modes, when needed. When the overlapped femtocell 120 transitions from the flexible private mode to the private mode and thus commands handover to a connected non-CSG UE, the non-CSG UE can perform handover to a macrocell. On the contrary, if the non-overlapped femtocell 130 transitions from the flexible private mode to the private mode and thus commands handover to a connected non-CSG UE, the non-CSG UE cannot perform handover to a macrocell or another femtocell. As a result, the non-CSG UE may not receive a communication service. Accordingly, when the non-overlapped femtocell 130 switches its operation mode, the communication service for the non-CSG UE should be considered.

Figure 8:
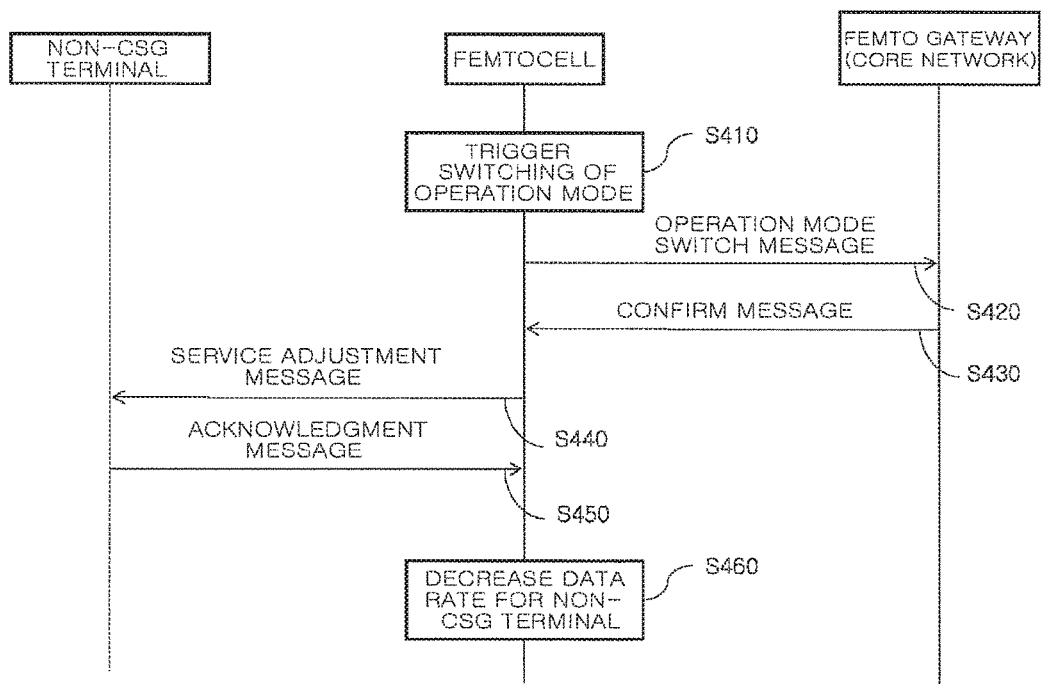
FIG. 8 illustrates a method for switching an operation mode of a femtocell according to a further embodiment of the present invention.

FIG. 8 illustrates a method for switching the operation mode of a femtocell according to a further embodiment of the present invention. Specifically, FIG. 8 illustrates a procedure for switching a non-overlapped femtocell from the flexible private mode to the private mode and an access procedure of a non-CSG UE according to the operation mode switching of the non-overlapped femtocell.

Referring to FIG. 8, while the following description is given in the context of a non-overlapped femtocell, the same operation mode switching method and the same access procedure for a non-CSG UE are also applicable to an overlapped femtocell.

The operation mode of a femtocell may be switched, upon occurrence of an operation mode switching trigger (S410). Transition from the flexible private mode to the private mode may be triggered upon request of a CSG UE or according to the service situation of the femtocell. A flexible private femtocell may determine to switch its operation mode, upon receipt of an access request from a CSG UE. Because the flexible private femtocell assigns access priority to a CSG UE, it may determine to transition to the private mode, upon request of the CSG UE for access. Or while the flexible private femtocell is providing a service to a CSG UE and a non-CSG UE, if the data rate of the CSG UE is increased and thus the service to the non-CSG UE may affect the service to the CSG UE, the femtocell may determine to transition to the private mode. If a data rate provided to a CSG UE within the flexible private femtocell is equal to or higher than a predetermined threshold, the flexible private femtocell may determine to transition to the private mode. If the remainder of the bandwidth of the private femtocell except for a bandwidth allocated to CSG UEs is equal to or lower than a threshold, the private femtocell may determine to transition to the private mode.

When determining to switch its operation mode, the femtocell transmits an operation mode switch message to the femto GW or the CN of the wireless communication system (S420). The operation mode switch message may contain information about the cell ID, CSG ID, CSG list, operation mode, etc. of the femtocell. Operation mode switching may amount to new setup of the femtocell. Operation mode switching information may be included in a setup message of the femtocell.

The femto GW or the CN may reply to the femtocell with a confirm message in response to the operation mode switch message (S430). The femto GW may notify the femtocell that the femtocell is a non-overlapped femtocell, taking into account the deployment of the femtocell. The femto GW or the CN may transmit non-overlapped femtocell information in the confirm message to the femtocell. Or the femtocell may already be aware that it is a non-overlapped femtocell. In this case, the femto GW or the CN may not transmit the non-overlapped femtocell information to the femtocell. The confirm message may not be transmitted in response to the operation mode switch message according to system implementation.

The femtocell transmits a service adjustment message to a non-CSG UE (S440). The service adjustment message may indicate a data rate decrease to the non-CSG UE. The service adjustment message may be broadcast to all UEs, or may be multicast or unicast to non-CSG UEs connected to the flexible private femtocell. The service adjustment message may be transmitted a predetermined number of times, at every predetermined interval until before the data rate of the non-CSG UE is adjusted. The service adjustment message may specify a time when the data rate is supposed to be adjusted. The service adjustment message may contain an indicator of one or more bits indicating data rate adjustment. For example, if the bit value of the indicator is 0, this may indicate data rate non-adjustment and if the bit value of the indicator is 1, this may indicate data rate adjustment, or vice versa. That is, if the bit value of the indicator is 0, this may indicate data rate adjustment and if the bit value of the indicator is 1, this may indicate data rate non-adjustment. The service adjustment message may be delivered in a ranging message, a paging message, a broadcast message, a synchronization signal, or system information. For instance, the indicator indicating data rate adjustment may be added to the ranging message, the paging message, the broadcast message, the synchronization signal, or the system information to thereby indicate the data rate adjustment of the femtocell. Or the data rate adjustment of the femtocell may be indicated without using an additional bit through phase shifting of the ranging message, the paging message, the broadcast message, the synchronization signal, or the system information. Or the CRC of the ranging message, the paging message, the broadcast message, the synchronization signal, or the system information may be masked by the indicator indicating the data rate adjustment of the femtocell, to thereby indicate that the data rate will be adjusted. The service adjustment message may be transmitted in a higher layer message such as an RRC message, a MAC message, or an L1/L2 message.

Upon receipt of the service adjustment message, a non-CSG UE transmits an acknowledgement message to the femtocell (S450). The non-CSG UE first verifies whether handover to a macrocell or another femtocell is possible. If the non-CSG UE wants to receive a service at a low data rate from the serving femtocell, it transmits an acknowledgment message to the femtocell. When determining to perform handover to a macrocell or another neighbor femtocell, the non-CSG UE may perform handover to the macrocell or the neighbor femtocell without transmitting the acknowledgment message.

The femtocell provides the service at a lower data rate to the non-CSG UE (S460). Upon receipt of the acknowledgment message from the non-CSG UE, the femtocell is kept in the flexible private mode without transitioning to the private mode, while only reducing the data rate of the non-CSG UE. If the femtocell fails to receive the acknowledgment message, the femto cell may transition to the private mode.

Figure 9:
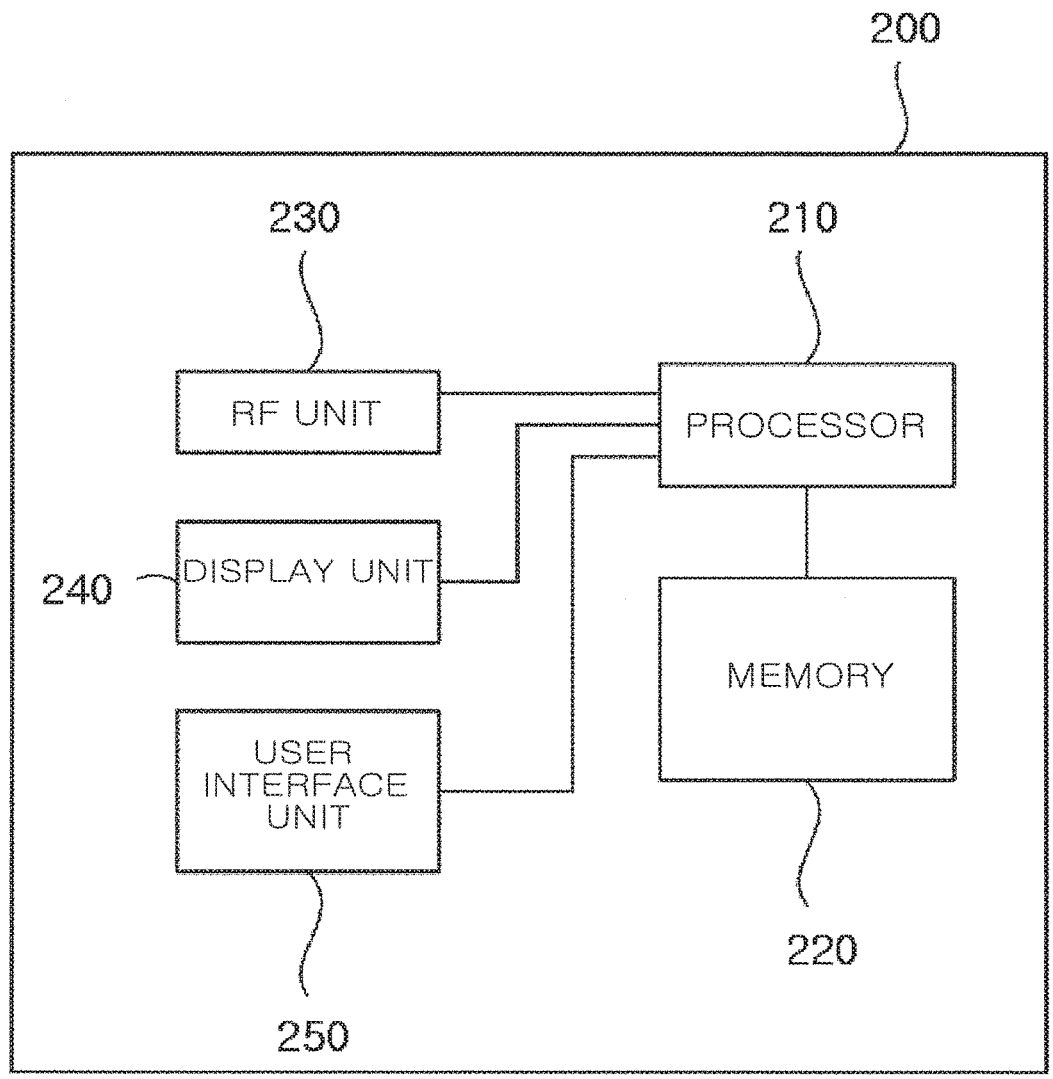
FIG. 9 is a block diagram of a User Equipment (UE).

FIG. 9 is a block diagram of a UE.

Referring to FIG. 9, a UE 200 includes a processor 210, a memory 220, an RF unit 230, a display unit 240, and a user interface unit 250. The processor 210 provides a control plane and a user plane by configuring radio interface protocol layers. The functionality of each layer may be realized through the processor 210. The processor 210 may perform an access procedure according to the operation mode of a femtocell, as described before. The processor 210 may implement an operation of the UE according to a function of the femtocell, as described later.

The memory 220 is connected to the processor 210 and stores a UE operating system, applications, and general files. The memory 220 may include a USIM (Universal Subscriber Identity Module). Cell IDs, CSG IDs, a CSG list, a white list, etc. may be stored in the memory 220, for the UE to access macrocells or femtocells.

The display unit 240 displays various types of information. The display unit 240 may be configured with a well known component such as an LCD (Liquid Crystal Display), OLEDs (Organic Light Emitting Diodes), etc. The user interface unit 250 may be configured using user interfaces in combination, such as a keypad, a touch screen, etc. The RF unit 230 is connected to the processor 210 and transmits and/or receives radio signals.

Figure 10:
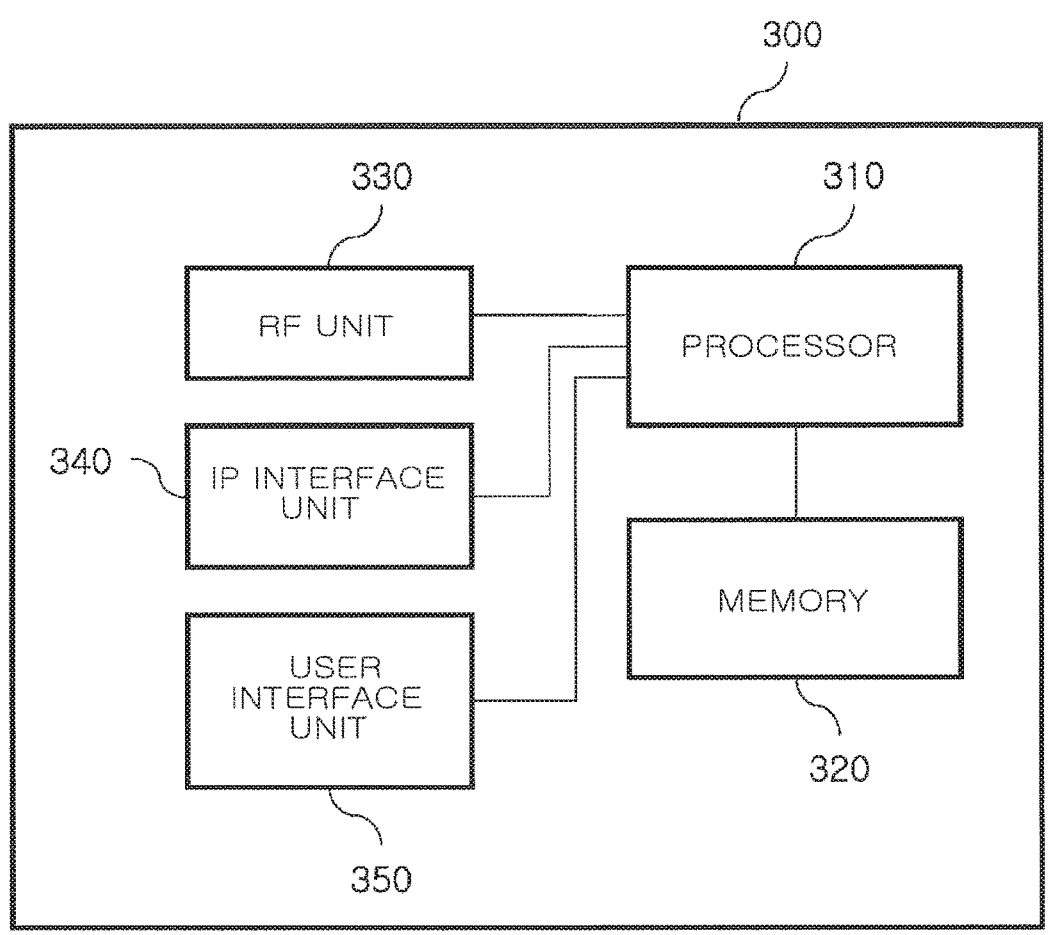
FIG. 10 is a block diagram of a femtocell.

FIG. 10 is a block diagram of a femtocell.

Referring to FIG. 10, a femtocell 300 includes a processor 310, a memory 320, an RF unit 330, an IP interface unit 340, and a user interface unit 350. The processor 310 provides a control plane and a user plane by configuring radio interface protocol layers. The functionality of each layer may be realized through the processor 310. The processor 310 may manage the afore-described operation modes of the femtocell. The processor 310 may distinguish a CSG UE from a non-CSG UE based on information stored in the memory 320. The processor 210 may perform a later-described function of the femtocell.

The memory 320 is connected to the processor 310 and stores a femtocell operating system, applications, and general files. The memory 320 may store CSG IDs, a CSG list, a white list, etc. in order to distinguish CSG UEs from non-CSG UEs.

The IP interface unit 340 supports connectivity to an IP network and may use a module such as a known module conforming to wireless LAN, ZigBee, PLC, HomePNA, or RS-485.

The user interface unit 350 may be configured with known user interfaces in combination, such as a keypad, a touch screen, etc. A user may adjust/switch the operation mode of the femtocell through the user interface unit 350. The RF unit 230 is connected to the processor 310 and transmits and/or receives radio signals.

<Movement of Femtocell>

Figure 11:
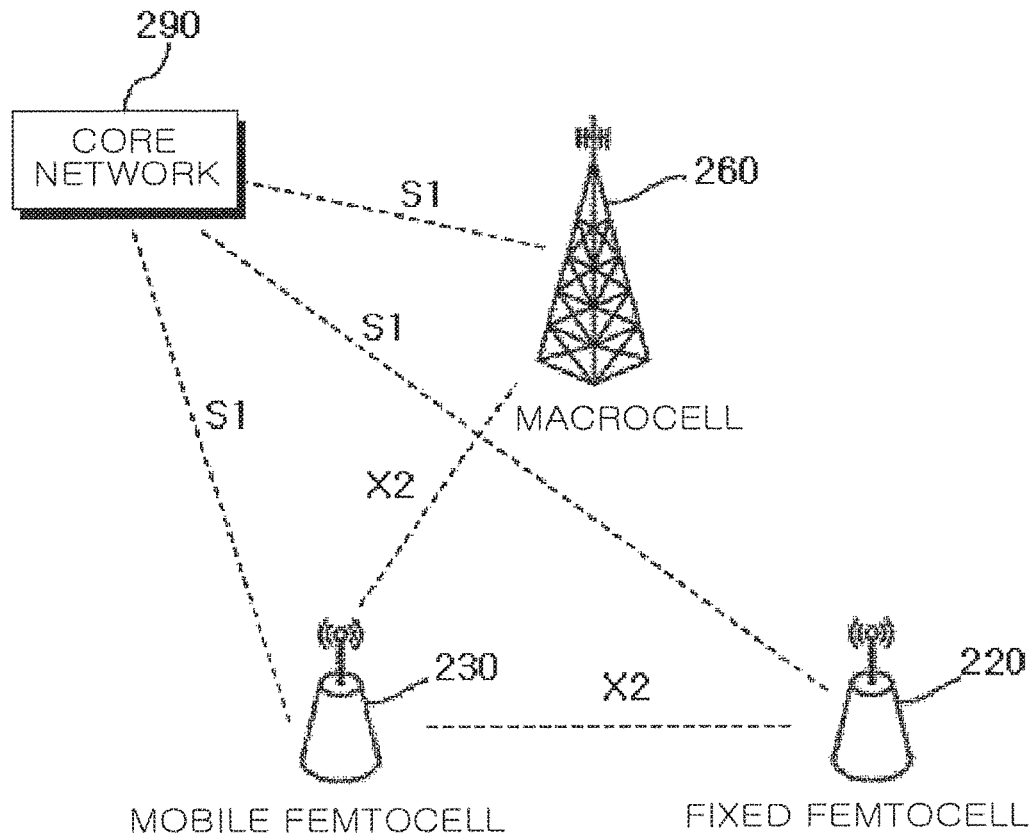
FIG. 11 is a block diagram of a wireless communication system including a mobile femtocell according to an embodiment of the present invention.

FIG. 11 is a block diagram of a wireless communication system including a mobile femtocell according to an embodiment of the present invention.

Referring to FIG. 11, a mobile femtocell 230 refers to a femtocell that is installed in a transportation vehicle like an aircraft, a ship, a train, a car, etc. and thus has mobility. On the other hand, a femtocell that is installed in a home or an office and thus does not have mobility is a fixed femtocell 220.

The mobile femtocell 230 may configure a radio interface X2 with a neighbor macrocell 260 or the fixed femtocell 220, as the transportation vehicle carrying the mobile femtocell 230 moves. The mobile femtocell 230 may configure an interface S1 with a CN 290 of the wireless communication system. The mobile femtocell 230 may be connected to the CN 290 through an IP network (i.e. a backbone network). The macrocell 260 and the fixed femtocell 220 also configure interfaces S1 with the CN 290.

(1) Exchange of Information Between Mobile Femtocell and Fixed Femtocell/Macrocell The mobile femtocell 230 may transmit information about UEs connected to it, information about the white list of each UE, etc. to the neighbor fixed femtocell 220 or the neighbor macrocell 260 via the radio interface X2 or the backbone network S1. For instance, when the mobile femtocell 230 moves toward the fixed femtocell 220 or the macrocell 260, the mobile femtocell 230 requests configuration of the radio interface X2 to the fixed femtocell 220 or the macrocell 260. Upon configuration of the radio interface X2, the mobile femtocell 230 may transmit information about UEs connected to it, information about the white list of each UE, etc. to the fixed femtocell 220 or the macrocell 260 via the radio interface X2. Or the mobile femtocell 230 may notify the fixed femtocell 220 or the macrocell 260 of its approach via the backbone network S1 configured with the CN 290 and may transmit the information about UEs connected to it, the information about the white list of each UE, etc. to the fixed femtocell 220 or the macrocell 260 via the backbone network S1.

The fixed femtocell 220 or the macrocell 260 may request the information about UEs connected to the mobile femtocell 230, the information about the white list of each UE, etc. to the mobile femtocell 230 via the radio interface X2 or the backbone network S1. Then the mobile femtocell 230 may transmit the information about UEs connected to the mobile femtocell 230, the information about the white list of each UE, etc. to the fixed femtocell 220 or the macrocell 260.

Meanwhile, the mobile femtocell 230 may broadcast its system information to the neighbor fixed femtocell 220, the neighbor macrocell 260, or adjacent UEs (not shown). Or the mobile femtocell 230 may multicast or unicast its system information. The mobile femtocell 230 may transmit a cell identification indicator in the system information. The cell identification indicator is an indicator (e.g. a 1-bit indicator) identifying the mobile femtocell 230 from the fixed femtocell 220 and/or the macrocell 260. Or a specific cell ID may be used to identify the mobile femtocell 230. The specific cell ID may be an existing PCID or a newly defined PCI. The mobile femtocell 230 may operate in a predetermined frequency band and thus it may be identified based on the predetermined frequency band.

The mobile femtocell 230 may preserve information about a departure and a destination. When arriving at the destination with information about UEs connected to the mobile femtocell 230 preserved, the mobile femtocell 230 may transmit the information about the connected UEs to the fixed femtocell 220 or the macrocell 260 at the destination. The information about the connected UEs may be transmitted via the radio interface X2 configured with the fixed femtocell 220 or the macrocell 260 or via the backbone network S1. In the case where the mobile femtocell 230 has information about the departure and the destination, it may not transmit the information about the connected UEs to the fixed femtocell 220 or the macrocell 260 that are located in a path. Meanwhile, the mobile femtocell 230 may provide a white list associated with the fixed femtocell 220 or the macrocell 260 at the destination to a UE carried in the transportation vehicle.

(2) Connectivity of Mobile Femtocell

Information about UEs of passengers may be provided to the mobile femtocell 230 installed in the transportation vehicle and thus the mobile femtocell 230 may restrict access according to the information. That is, the mobile femtocell 230 may generate a CSG UE list by acquiring information about the UEs within the transportation vehicle. The mobile femtocell 230 may provide its information as a white list to the UEs of the passengers. The UEs may write the mobile femtocell 230 in their white lists and access the mobile femtocell 230 using the white lists.

The mobile femtocell 230 may configure an inter-BS interface X2 with a neighbor macrocell, microcell, mobile/fixed femtocell, picocell, etc. The mobile femtocell 230 may be a public femtocell accessible to all UEs, a private femtocell accessible only to particular UEs, or a flexible private femtocell.

Meanwhile, the mobile femtocell 230 may charge users connected to it for services by transmitting information about the users to the network. A UE may request an authentication token for accessing the mobile femtocell 230 to the mobile femtocell 230 or to the neighbor fixed femtocell 220 or macrocell 260. The cell determines whether the UE can access the mobile femtocell 230 by checking whether the UE has been charged for services, authenticated, etc. The cell may assign an authentication token for accessing the mobile femtocell 230 to the UE that can access the mobile femtocell 230. The UE may perform an access procedure to the mobile femtocell 230 using the authentication token. The authentication token that grants the UE with access to the mobile femtocell 230 may be maintained or extinguished according to a condition such as a predetermined time, period, area, etc.

The above-described information about connectivity to the mobile femtocell 230 may be broadcast, multicast, or unicast to the UE.

(3) Channel of Mobile Femtocell

The mobile femtocell 230 may share all or a part of a channel (a frequency band) used by the macrocell 260. Alternatively, the mobile femtocell 230 may use a specific frequency band different from the frequency band of the macrocell 260. The mobile femtocell 230 may share all or a part of the frequency band of a channel used by the fixed femtocell 220 or may operate in a different frequency band from the frequency band of the fixed femtocell 220. Information about a channel (a frequency band) used by the mobile femtocell 230 may be broadcast, multicast, or unicast. The mobile femtocell 230 may configure an inter-BS interface X2 with a neighbor mobile/fixed femtocell and exchange channel information with the neighbor mobile/fixed femtocell via the interface X2 or the backbone network.

A UE may identify the mobile femtocell 230 based on an indicator or specific PCID indicating the mobile femtocell 230 and may thus be aware of the frequency band of the mobile femtocell 230.

Synchronization is acquired between the mobile femtocell 230 and the macrocell 260 in a GPS-based, Precision Timing Protocol (IEEE 1588, PTP)-based, or radio interface-based manner. Or the mobile femtocell 230 may acquire synchronization to the macrocell 260 by acquiring information about the macrocell 260 from an adjacent UE. The macrocell 260 may transmit a predetermined pilot pattern at every predetermined interval and the mobile femtocell 230 may acquire synchronization to the macrocell 260 by receiving the predetermined pilot pattern.

<Operation Modes of Femtocell>

Figure 12:
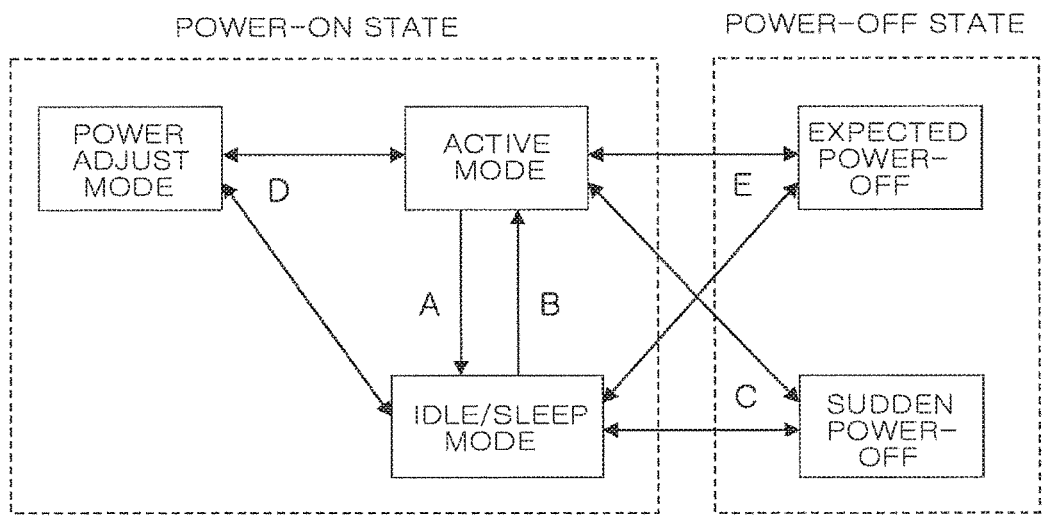
FIG. 12 is a block diagram illustrating operation modes of a femtocell according to an embodiment of the present invention.

FIG. 12 is a block diagram illustrating operation modes of a femtocell according to an embodiment of the present invention.

Referring to FIG. 12, even though a number of femtocells are deployed within a macrocell, all femtocells do not provide services to UEs. Nonetheless, the femtocells transmit system information periodically. For transmission of system information, a broadcast channel should be allocated to each femtocell. As a result, problems such as radio resource waste and unnecessary cell measurement of an adjacent UE may occur. In order to efficiently use limited radio resources and reduce inter-cell interference and the power consumption of femtocells, operation modes may be defined and operated for the femtocells.

A femtocell may be placed in a power-on or power-off state. In the power-on state, the femtocell may operate in active mode, idle/sleep mode, power adjust mode, etc. The power-off state of the femtocell includes an expected power-off state and a sudden power-off state.

The active mode refers to a state in which the femtocell is providing a communication service to a UE, whereas the idle/sleep mode is a state in which the femtocell is not providing a communication service to any UE. The power adjust mode refers to a state in which the femtocell adjusts DL/UL power. For instance, the femtocell may adjust DL/UL power according to its operation in the active mode or idle/sleep mode or to mitigate inter-cell interference according to self-organization or operation mode switching of a neighbor femtocell.

The femtocell is placed in the expected power-off state, when it expects power-off, while it is in the sudden power-off state when power is off unexpectedly. For example, when the femtocell is disconnected from an IP network or the transmission rate of the IP network drops to or below a predetermined minimum transmission rate, the femtocell may transition to the expected power-off state. On the other hand, if power is blocks all of sudden or a radio interface is blocked between the femtocell and a UE, the femtocell may transition to the sudden power-off state.

A. Transition from Active Mode to Idle/Sleep Mode

An idle-mode/sleep-mode femtocell transmits system information in a longer period than an active-mode femtocell. An idle-mode femtocell may transmit system information in a longer period than a sleep-mode femtocell. When all UEs to be serviced move out of the cell area of the femtocell or perform handover to other femtocells or macro cells, the femtocell may transition to the idle mode or sleep mode. Or when all UEs to be serviced transition to idle mode or sleep mode, the femtocell may also transition to the idle mode or sleep mode. Herein, the femtocell may switch its operation mode to the idle/sleep mode a predetermined mode switching time later. The mode switching time may be a time needed for the femtocell to switch its operation mode or a time by which the operation mode switching is delayed. When determining to switch its operation mode, the femtocell may notify the femto GW or the CN of its operation mode switching. The operation mode switching may be signaled to the femto GW or the CN in a setup message of the femtocell.

B. Transition from Idle/Sleep Mode to Active Mode

A femtocell may transition to the active mode upon request of a UE. The UE may request the femtocell to transition to the active mode, based on its white list. The UE may receive the white list from a higher layer. The idle-/sleep-mode femtocell may wake up at every predetermined interval and monitor whether there is a UE to be serviced around the femtocell. The UE may request the femtocell to transition to the active mode in a listening interval during which the femtocell is awake. Or the UE may request the femtocell's transition to the active mode to a macrocell covering the area of the femtocell and then the macrocell may request the femtocell to transition to the active mode.

Meanwhile, the femto GW or the CN may switch the operation mode of a femtocell. An active-mode femtocell notifies the femto GW or the CN that it is not servicing any UE and the femto GW or the CN may command the femtocell to transition to the idle/sleep mode. Specifically, the femto GW or the CN may determine the service state of a neighbor femtocell and may command switching of the operation mode of the femtocell according to the situation of the neighbor femtocell. For example, if a large number of UEs are connected to the neighbor femtocell and thus a UE needs handover to the femtocell, the femto GW or the CN may command the femtocell to operate in the active mode. The femto GW or the CN may command switching of the operation mode of the femtocell, taking into account the neighbor femtocell and mobility of UEs around the femtocell. For instance, the femto GW or the CN determines whether a UE is approaching the femtocell and may command the femtocell to transition from the idle/sleep mode to the active mode according to the determination. The femto GW or the CN may command the femtocell to switch its operation mode, upon request of the neighbor femtocell. For instance, when a neighbor femtocell requests a specific femtocell to transition to the idle/sleep mode, the femto GW or the CN may determine whether the specific femtocell can transition to the idle/sleep mode and may command the specific femtocell to transition to the idle/sleep mode according to the determination.

C. Transition from Power-on State to Sudden Power-Off State

A femtocell is connected to a mobile communication CN via an IP network in a home or an office. The IP network is a public network that multiple users access. During a communication service for a UE, the UE may be suddenly disconnected from the IP network or a network transmission rate may be decreased to or below a threshold. In addition, the user may turn off the femtocell or the femtocell may be turned off due to a blackout during the communication service in progress. The sudden power-off of the femtocell may cause interruptions to voice service and thus may degrade the quality of data service. When the UE is disconnected from the femtocell, it should perform fast handover to a neighbor femtocell or a macrocell to receive the on-going communication service seamlessly.

There exists a need for a method for enabling the UE to rapidly identify the sudden power-off of the femtocell. For this purpose, the femtocell may periodically transmit information indicating its power-on in the active mode and/or the idle/sleep mode. If a UE has not received the information indicating power-on from the femtocell, it may determine sudden power-off of the femtocell. Then the UE performs handover to a neighbor femtocell or a macrocell. Meanwhile, the UE may determine the sudden power-off of the femtocell, if it monitors system information, a broadcast signal, etc. from the femtocell and has not received a signal for a predetermined time from the femtocell. Upon detection of the sudden power-off of the femtocell, the UE may update state information of the femtocell in its white list. During the UE's handover to the neighbor femtocell or the macrocell, the femtocell may transmit its state information to a target BS.

When an idle-mode or sleep-mode UE attempts to communicate with a femtocell within the femtocell, it should be able to detect the power-off state of the femtocell. If the UE has not received a signal from the femtocell for a predetermined time or the UE receives a signal at a data rate equal to or lower than a threshold from the femtocell, while monitoring system information, a broadcast signal, etc. from the femtocell, the UE may notify a neighbor femtocell or a macrocell of the sudden power-off of the femtocell. The data rate threshold of the femtocell may be predetermined or differentiated depending on communication service types. For example, the data rate threshold may be set to be high for a real-time communication service and to be low for a non-real-time communication service.

The macrocell may store a list of UEs connected to a femtocell within its coverage and may grant access to a UE that attempts handover due to the sudden power-off of the femtocell, with priority. For instance, a UE that attempts handover due to the sudden power-off of a femtocell may perform handover in a non-contention-based manner or using an ID pre-allocated by the macrocell.

D. Transition to Power Adjust Mode

Transmission power control of a femtocell is most significant in reducing interference between the femtocell and a macrocell or a neighbor femtocell. While research is underway as to how to determine the maximum and minimum transmission power of a femtocell, there is no specified method for determining the transmission power of a femtocell, taking into account the operation mode of the femtocell.

The femtocell may control the transmission power of system information, a broadcast signal, etc. as well as their transmission intervals according to the operation mode of the femtocell. For example, an active-mode femtocell may provide a communication service with high transmission power, whereas an idle-mode/sleep-mode femtocell may provide a communication service with low transmission power. Control of the transmission power of a femtocell according to its operation mode means that the cell coverage of the femtocell is changed according to its operation mode. If the cell coverage of the femtocell is changed, a neighbor femtocell list may be changed and radio resources may be allocated to neighbor femtocells in a different manner. That is, the change of the cell coverage of a femtocell may change the interference structure between femtocells and to control the interference structure, the power of femtocells may be controlled.

A femtocell may controls its transmission power to a predetermined level, based on interference that the femtocell measures with respect to a neighbor femtocell, based on an interference measurement report from a UE, or according to a command from the network, depending on whether the femtocell is in the active mode or the idle/sleep mode. When determining to control its transmission power, the femtocell may broadcast power control information in system information, or may multicast or unicast the power control information to specific UEs.

A femtocell operates in power adjust mode, taking into account its power-on/off that may occur at any time. For example, if a second femtocell is installed through self-organization near to a first femtocell that has appropriate cell coverage, the first and second femtocells need to adjust their cell coverage in order to reduce interference between them. To control the cell coverage between the femtocells, (a) the femtocells may exchange transmission power information by establishing an interface between them. Or (b) the femtocells may provide their own transmission power information over the network and receive a transmission power control message from the network. Or (c) the femtocells may control their cell coverage according to an interference report from a UE.

E. Transition from Power-on State to Expected Power-Off State

To transition to the expected power-off state, a femtocell may broadcast information about the start time of the power-off state, the duration of the expected power-off state, etc. to UEs. The femtocell may transmit the information about the start time of the power-off state, the duration of the expected power-off state, etc. to the femto GW or the CN. The CN may transmit the information to a neighbor femtocell or a macrocell. A UE may write the expected power-off state in its white list. The UE may notify the neighbor femtocell or the macrocell of the expected power-off state of the femtocell. The neighbor femtocell or the macrocell may be aware of the expected power-off state of the femtocell by receiving a report from the UE or related information from the CN and may write the expected power-off state of the femtocell in its neighbor BS list.

<Handover from Femtocell to Macrocell or Femtocell>

Figure 13:
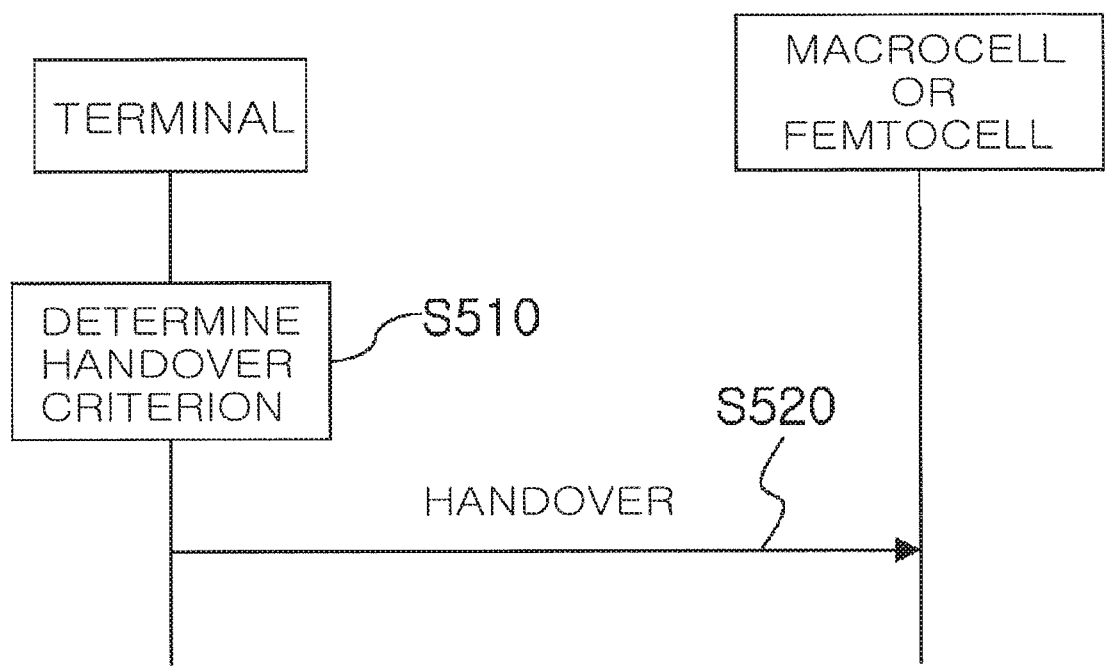
FIG. 13 is a flowchart illustrating a handover procedure according to an embodiment of the present invention.

FIG. 13 is a flowchart illustrating a handover procedure according to an embodiment of the present invention.

Referring to FIG. 13, a UE connected to a femtocell determines a defined handover criterion (S510). The UE determines whether to perform handover to a macrocell or a neighbor femtocell by determining the handover criterion. Handover from a femtocell to a macrocell or a neighbor femtocell is called outbound handover.

Outbound handover criteria may be defined as follows.

(1) Signal strength measurement: when the UE moves out of the cell coverage of the femtocell, the UE measures the strengths of signals received from neighbor cells and performs handover to a cell having the greatest signal strength.

(2) Emergency call: the UE is connected to the femtocell according to an emergency call. Upon expiration of an emergency call condition, the UE performs handover to a macrocell.

(3) Power-off state of femtocell: when the femtocell is placed in the power-off state, the UE performs handover to a macrocell or a neighbor femtocell.

(4) Data rate threshold of femtocell: if the data rate of the femtocell drops to or below a predetermined threshold, the UE performs handover to a macrocell or a neighbor femtocell. The threshold may be an absolute lowest data rate determined irrespective of communication service types or may be a relative service-based data rate set according to a service type (e.g. VoIP, a data packet, MBS, etc.).

(5) Service policy of femtocell: when a use condition of the UE is released according to a service policy of the femtocell, the UE performs handover to a macrocell or a neighbor femtocell. The femtocell may request handover to the UE according to its service policy. The service policy may include the type, use time, etc. of a service assigned to the UE in case of a charging femtocell, and a movement path, area, etc. in case of a mobile femtocell.

The UE performs handover to the macrocell or the neighbor femtocell according to the result of the determination made as to the handover criterion (S520). The UE may set at least one of the above-described handover criteria as its handover criterion. If the handover criterion is met, the UE performs an outbound handover procedure.

All of the above-described functions may be implemented by a processor such as a microprocessor, a controller, a microcontroller, or an Application Specific Integrated Circuit (ASIC) in software or program code created to perform the functions. The design, development, and execution of the code will be apparent to those skilled in the art based on the description of the present invention.

While the present invention has been described referring to the embodiments set forth above, those skilled in the art will appreciate that many variations and modifications may be made without departing from the spirit and scope of the present invention. The scope of the invention should be determined by the appended claims and their legal equivalents, not by the above description.

The invention claimed is:

1. A method for receiving, by a non-closed subscriber group (CSG) terminal, a service in a wireless communication system, the method comprising:

receiving the service from a first home base station,
wherein the service is provided in a first operation mode of the first home base station, and
wherein the first operation mode is an operation mode that the service is provided to a closed subscriber group (CSG) terminal that belongs to a specific terminal group and a non-CSG terminal that does not belong to the specific terminal group; and
determining whether or not to perform a handover to a second home base station based on whether to continuously provide the service to the non-CSG terminal in the first home base station,
wherein:
when the service is not continuously provided to the non-CSG terminal in the first home base station, performing the handover to the second home base station, and
when the service is continuously provided to the non-CSG terminal in the first home base station, a data rate of the service provided in the first operation mode of the first home base station is reduced.

2. The method of claim 1, further comprising:
receiving, from the first home base station, a service adjustment message; and
transmitting, to the first home base station, an acknowledgement message in response to the service adjustment message,
wherein if the acknowledgement message is received by the first home base station, the service is provided continuously from the first home base station.

3. The method of claim 1, further comprising:
receiving, from the first home base station, a control message indicating a time when the first home base station switches to a second operation mode,
wherein the second operation mode is an operation mode that the service is provided only to the CSG terminal.

4. The method of claim 1, wherein the second home base station is a base station capable of communicating with the CSG terminal and the non-CSG terminal.

5. The method of claim 1, wherein the second home base station is configured to a specific operation mode.

6. The method of claim 5, wherein the specific operation mode is the first operation mode, a second operation mode or a third operation mode,
wherein the second operation mode is an operation mode that the service is provided only to the CSG terminal, and the third operation mode is an operation mode that the home base station operates as a normal base station, and
wherein the home base station is a home NodeB(HNB) or a home eNodeB(HeNB).

7. A non-closed subscriber group (CSG) terminal for receiving a service in a wireless communication system, comprising:

a radio frequency (RF) transceiver unit; and
a processor configured to:
  receive the service from a first home base station,
  wherein the service is provided in a first operation mode of the first home base station, and
  wherein the first operation mode is an operation mode that the service is provided to a closed subscriber group (CSG) terminal that belongs to a specific terminal group and a non-CSG terminal that does not belong to the specific terminal group; and
  determine whether or not to perform a handover to a second home base station based on whether to continuously provide the service to the non-CSG terminal in the first home base station, wherein:
    when the service is not continuously provided to the non-CSG terminal in the first home base station, perform the handover to the second home base station, and
    when the service is continuously provided to the non-CSG terminal in the first home base station, a data rate of the service provided in the first operation mode of the first home base station is reduced.

8. The terminal of claim 7, wherein the second home base station is configured to a specific operation mode.

9. The terminal of claim 8, wherein the specific operation mode is the first operation mode, a second operation mode or a third operation mode,
  wherein the second operation mode is an operation mode that the service is provided only to the CSG terminal, and the third operation mode is an operation mode that the home base station operates as a normal base station, and
  wherein the home base station is a home NodeB(HNB) or a home eNodeB(HeNB).

* * * * *